US009338777B2

(12) United States Patent
Brunel et al.

(10) Patent No.: US 9,338,777 B2
(45) Date of Patent: May 10, 2016

(54) METHOD AND DEVICE FOR ADJUSTING THE TRANSMISSION OF THE SIGNALS (75) Inventors: Loic Brunel, Rennes (FR); Nicolas Gresset, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 482 days.

(21) Appl. No.: 13/540,115

(22) Filed: Jul. 2, 2012

(65) Prior Publication Data
US 2013/0012199 A1   Jan. 10, 2013

(30) Foreign Application Priority Data

Jul. 7, 2011   (EP) ..................................... 11173025

(51) Int. Cl.
*H04W 8/00* (2009.01)
*H04W 72/04* (2009.01)
*H04W 84/04* (2009.01)

(52) U.S. Cl.
CPC ........ *H04W 72/0426* (2013.01); *H04W 84/045* (2013.01)

(58) Field of Classification Search
CPC ..... H04L 5/003; H04L 5/0032; H04L 5/0033; H04L 5/0035; H04L 5/0037; H04L 5/0039; H04L 5/0041; H04L 5/0042; H04B 7/02; H04B 7/022; H04B 7/024; H04B 7/026; H04W 52/04; H04W 52/18; H04W 52/24; H04W 52/241; H04W 52/242; H04W 52/243; H04W 52/244; H04W 52/245; H04W 52/246; H04W 52/26; H04W 52/40; H04W 24/10
USPC ........ 455/422.1, 423–425, 432.1, 450–452.2, 455/63.1–63.2; 370/328–329, 252
See application file for complete search history.

(56) References Cited

U.S. PATENT DOCUMENTS

| 8,831,523 B2 * | 9/2014 | Damnjanovic et al. ...... 455/63.2 |
| 2009/0264077 A1 * | 10/2009 | Damnjanovic ............... 455/63.1 |

(Continued)

FOREIGN PATENT DOCUMENTS

WO   WO 2009/129413 A2   10/2009

OTHER PUBLICATIONS

Extended European Search Report issued on Jan. 4, 2012 in corresponding European Application No. 11 17 3025 filed on Jul. 7, 2011.

*Primary Examiner* — Kashif Siddiqui
*Assistant Examiner* — Minjung Kim
(74) *Attorney, Agent, or Firm* — Oblon, McClelland, Maier & Neustadt, L.L.P.

(57) ABSTRACT

The present invention concerns a method and a device for adjusting the transmission of the signals transferred by a home base station through a wireless interface, the home base station is located in a cell of a base station, the home base station belongs to a first tracking area, the base station belongs to a second tracking area in which a mobile is supposed to be. The home base station:
- transfers through the wireless interface signals identifying a third tracking area which is different from the first and second tracking areas and which the base station and the home base station do not belong to,
- checks if a signal is received from the mobile terminal in response to the transferred signals identifying the third tracking area,
- enters an inter cell interference coordination procedure if the signal is received from the mobile terminal in response.

12 Claims, 5 Drawing Sheets

(56) References Cited

U.S. PATENT DOCUMENTS

| | | |
|---|---|---|
| 2010/0075698 A1 | 3/2010 | Rune et al. |
| 2011/0105135 A1 | 5/2011 | Krishnamurthy et al. |
| 2011/0117967 A1 | 5/2011 | Vedantham et al. |
| 2011/0143802 A1 | 6/2011 | Shin et al. |
| 2012/0190374 A1* | 7/2012 | Jo et al. .......... 455/450 |

* cited by examiner

METHOD AND DEVICE FOR ADJUSTING THE TRANSMISSION OF THE SIGNALS

The present invention relates generally to a method and a device for adjusting the transmission of the signals transferred by a home base station through a wireless interface.

Wireless cellular telecommunication networks are largely deployed but there are still some areas not covered by the base stations of the wireless cellular telecommunication network. The base stations are deployed by an operator according to a given planning.

For example, the access to the wireless cellular telecommunication network might not be possible or might require a too high transmission power or a too low spectral efficiency, i.e., too many system resources for a mobile terminal located in a building, if the signals radiated by the base stations and/or by the mobile terminal are too attenuated.

Particular base stations which are not necessarily deployed by the operator and thus not following a given planning, like home base stations or femto base stations or pico base stations or relays, may be installed into buildings in order to provide coverage areas within the buildings and base station offload. Relays may also provide outdoor coverage extension.

The home base stations or femto base stations provide a limited coverage area.

Due to the constant coverage area size reduction and spectral efficiency increase, inter-cell interference has become a main issue. Inter-cell interference coordination (ICIC) techniques intend to mitigate the inter-cell interference problem. Classically, a mobile terminal reports to the base station the mobile terminal is currently served by, the interference it receives from neighbouring base stations and/or home base stations. Base stations exchange also messages between each other in order to allow an efficient ICIC. However, the base station to base station messages need establishment of links between the base stations. The same links between base stations and home base stations or between home base stations cannot be established in some cases.

Massive deployment of home base stations prevents from having such links between a base station and all the home base stations located within the coverage area of the base station. Even if the links exist, the amount of messages on these links must be as low as possible in order not to put an excessive burden on the core network. These home base stations may strongly interfere with the base station and even create coverage holes.

The home base stations may enable a limited number of mobile terminals to access the wireless cellular telecommunication network through their respective resources. The mobile terminals allowed to access the resources of the wireless cellular telecommunication network through the home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and its family can access the wireless cellular telecommunication network through the home base station. These mobile terminals are associated with the home base station. These mobile terminals are identified according to a list of identifiers, named for example Closed Subscriber Group (CSG) of the home base station.

Base stations enable a large number of mobile terminals to access the wireless cellular telecommunication network through their respective resources. The mobile terminals allowed to access the resources of the network through the base station may be determined by the operator of the wireless cellular telecommunication network.

The granting of the access to the resources of the wireless cellular telecommunication network through the home base station may be decided by the home base station or by core network devices of the wireless cellular telecommunication network or the mobile terminal, by itself may decide not to respond to signals transferred by the home base station if the mobile terminal is not associated to the home base station i.e. if the identifier of home base station is not comprised in the CSG list of the mobile terminal.

The cell of a base station is usually much larger than a cell of a home base station.

In a building, when a home base station radiates signals within its cell or cells, the signals radiated by the home base station may interfere with the signals radiated by the base station one cell of which covers the cell or cells of the home base station.

The interference level may be so important that a mobile terminal in idle mode and located in one cell of the home base station may not receive any synchronisation or control signal from the base station.

That situation generates problems when the mobile terminal does not belong to the CSG of the home base station or when the home base station does not belong to the CSG list of the mobile terminal.

When trying to connect to the wireless cellular telecommunication network in order to autonomously initiate connection or after paging, the mobile terminal is rejected by the home base station because it does not belong to the CSG of the home base station and is not able to connect a base station due to too high interference.

The present invention aims at avoiding that a mobile terminal located in a cell of a home base station and which is not associated to the home base station may not receive any synchronisation or control signal from the base station.

To that end, the present invention concerns a method of adjusting the transmission of the signals transferred by a home base station through a wireless interface, the home base station being located in a cell of a base station, the home base station belonging to a first tracking area, the base station belonging to a second tracking area in which a mobile is supposed to be characterised in that the method comprises the steps executed by the home base station of:

transferring through the wireless interface signals identifying a third tracking area which is different from the first and second tracking areas and which the base station and the home base station do not belong to, checking if a signal is received from the mobile terminal in response to the transferred signals identifying the third tracking area, entering an inter cell interference coordination procedure if the signal is received from the mobile terminal in response.

The present invention concerns also a device for adjusting the transmission of the signals transferred by a home base station through a wireless interface, the home base station being located in a cell of a base station, the home base station belonging to a first tracking area, the base station belonging to a second tracking area in which a mobile is supposed to be characterised in that the device for adjusting the transmission of the signals transferred by the home base station is included in the home base station and comprises:

means for transferring through the wireless interface signals identifying a third tracking area which is different from the first and second tracking areas and which the base station and the home base station do not belong to, means for checking if a signal is received from the mobile terminal in response to the transferred signals identifying the third tracking area, means for entering an inter cell interference coordination procedure if the signal is received from the mobile terminal in response.

Thus, by sending signals identifying the third tracking area, the home base station makes it mandatory for a mobile terminal in idle mode entering its coverage area to send a signal in response to the transferred signals identifying the third tracking area, in order to perform a tracking area update procedure.

The tracking area is a set of cells. When a mobile terminal is known to be located in a tracking area, it can be reached by sending a paging signal in all cells of the tracking area. When a mobile terminal detects through cell search and system information decoding that it has moved to a new tracking area, it must inform the wireless cellular telecommunication network through the tracking area update procedure.

Thus, the tracking area update procedure enables to locate a mobile terminal in idle mode in the wireless cellular telecommunication network.

Indeed, a mobile terminal in idle mode is not connected to a base station or home base station and does not transfer signals regularly. Thus, it is impossible to easily locate a mobile terminal in idle mode and the present invention makes it possible through already existing procedures, for instance in 3GPP LTE (Third Generation Partnership Project Long Term Evolution) specifications.

Furthermore, entering an inter-cell interference procedure, enables, after detection of the mobile terminal in idle mode, to ensure reliable communication between the mobile terminal and the base station, even under the coverage of the home base station, when the mobile terminal is not associated to the home base station, in case the mobile terminal would need to leave the idle mode to connect to the wireless cellular telecommunication network.

Furthermore, entering the inter-cell interference procedure only when mobile terminals which are not associated to the home base station enter the home base station coverage area ensures improved performance for the home base station the rest of time, since, otherwise, inter-cell interference procedures at the home base station reduce its performance.

According to a particular feature, the first and second tracking areas are different tracking areas or the second and third tracking areas are identical.

Thus, it is not necessary to send paging messages to a mobile terminal through many home base stations when the mobile terminal is not located under the coverage of a home base station it is associated with.

Indeed, by having two different tracking areas, paging can be sent only through the base station or only though the home base stations.

According to a particular feature, the home base station further transfers through the wireless interface information indicating on which resources the mobile terminal MT has to transfer the signal.

Thus, it is possible at the home base station to discriminate the signal received from a mobile terminal in response to the transferred signals identifying to the third tracking area, from other signals sent from other mobile terminals in response to the transferred signals identifying the first and/or the second tracking areas. It is possible and beneficial to indicate different resources corresponding to the first, the second and the third tracking areas.

According to a particular feature, plural home base stations are located in the cell of the base station and signals identifying the third tracking area are transferred by at least two home base stations.

Thus, a same signal received from a mobile terminal in response to the transferred signals identifying the third tracking area can be received at several home base stations and the inter-cell interference procedure can be started at several home base stations at the same time if needed.

It further reduces the interference encountered by the mobile terminal compared to the case where a single home base station enters the inter-cell interference procedure.

It can also facilitate mobility among coverage areas of several home base stations located in the cell of the base station.

Finally, sending the same signals from different home base stations can help reducing the transmission power at each home base station and reducing the interference generated by these signals on other home base station signals.

According to a particular feature, once the home base station enters the interference coordination procedure, the home base station interrupts the transfer through the wireless interface of signals identifying the third tracking area.

Thus, the interference generated by the signals identifying the third tracking area on signals transferred by other home base stations is avoided when their transmission is not needed anymore.

Indeed, as long as the home base station is in the inter-cell interference procedure the detection of mobile terminals in idle mode is not needed anymore and the related transfer of signals is not needed.

According to a particular feature, once the transfer of signals identifying the third tracking area is interrupted, the home base station:

checks if a signal is received from one mobile terminal in response to signals identifying one tracking area different from the first and second tracking areas, releases the inter cell interference coordination procedure if the signal is received from one mobile terminal.

Thus, the inter-cell interference procedure can be released when it is not needed anymore, i.e., when the mobile terminal in idle mode the inter cell interference procedure is intended for leaves the home base station coverage area.

When it happens, the mobile terminal transfers a signal in response to the signals transferred by a neighbouring home base station identifying one tracking area different from the first and second tracking areas.

Thus, using this signal, the home base station can assume that the mobile terminal will leave the home base station coverage area.

According to a particular feature, the home base station measures the received power of the signal received from the mobile terminal in response to the transferred signals identifying the third tracking area and the entering the inter cell interference coordination procedure is further decided according to the measured received power.

Thus, the home base station enters the inter-cell interference procedure only when it has a significant impact on the mobile terminal performance. Indeed, when the signal transferred by the mobile terminal is always transferred with the same power, the lower the received signal power is, the lower the interference generated by the home base station on the mobile terminal is.

According to a particular feature, the home base station transfers through a network linking the home base station and other home base stations which are located in the cell of the base station, a message to the other home base stations indicating that the home base station enters the inter cell interference coordination procedure.

Thus, the inter-cell interference procedure can be released when it is not needed anymore, i.e., when the mobile terminal in idle mode the inter cell interference procedure is intended for leaves the home base station coverage area.

When receiving a signal from a neighbouring home base station, the home base station can assume that the mobile terminal will leave the home base station coverage area.

Furthermore, if this message includes some mobile terminal identity, the assumption of the home base station can be even more accurate.

According to a particular feature, the home base station:

receives from one of the other home base stations a message indicating that the other home base station enters the inter cell interference coordination procedure, releases the inter cell interference coordination procedure once the message is received from the other home base station.

Thus, the inter-cell interference procedure is released when it is not needed anymore, i.e., when the mobile terminal, in idle mode and for which the inter cell interference procedure is intended, leaves the home base station coverage area.

When receiving a signal from a neighbouring home base station, the home base station can assume that the mobile terminal leaves the home base station coverage area.

According to a particular feature, the home base station prior to releasing the inter cell interference coordination procedure monitors the power of uplink signals transferred by mobile terminals which are not authorized to communicate with the home base station in order to detect if one mobile terminal is communicating with the base station.

Thus, the inter-cell interference procedure is not released when it is still needed by mobile terminals communicating with the base station. Since these mobile terminals regularly send signals to the base station, they can be easily detected by the home base station. Not releasing the inter-cell interference procedure when they are detected avoids having call dropping for these mobile terminals.

According to a particular feature, once the home base station enters the interference coordination procedure, the home base station releases the inter cell interference coordination procedure after a predetermined time duration.

Thus, when the inter cell interference coordination procedure is released, each mobile terminal which is under the coverage of the home base station and is not associated with the home base station does not receive signals from the base station anymore.

Thus, it has to perform a tracking area update and has to send a RACH signal in response to signals identifying the third tracking area. If at least one such mobile terminal exists, the home base station receives its RACH signal and can enter the inter cell interference coordination procedure again. Otherwise, it means that the inter cell interference procedure is not required for the moment and the home base station does not have to stay in the inter cell interference procedure. This test after a predetermined time duration avoids unnecessarily staying in the inter cell interference procedure and enables home base station performance improvement.

According to a particular feature, once the inter cell interference coordination procedure is released, the home base station:

transfers through the wireless interface signals identifying the third tracking area which is different from the first and second tracking areas and which the base station and the home base station do not belong to, checks if a signal is received from the mobile terminal in response to the transferred signals identifying to the third tracking area, enters the inter cell interference coordination procedure if the signal is received from the mobile terminal in response.

Thus, if the transfer of the signals identifying the third tracking area has been stopped when the home base station has entered the inter cell interference procedure, it can be restarted when the inter cell interference procedure is released. Thus, a mobile terminal which is under the coverage of the home base station and is not associated with the home base station does not receive signals from the base station anymore but still receives signals identifying the third tracking area. Thus, it can perform a tracking area update and send a RACH signal in response to signals identifying the third tracking area in order to trigger the inter cell interference procedure at the home base station.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which.

Figure 1A:
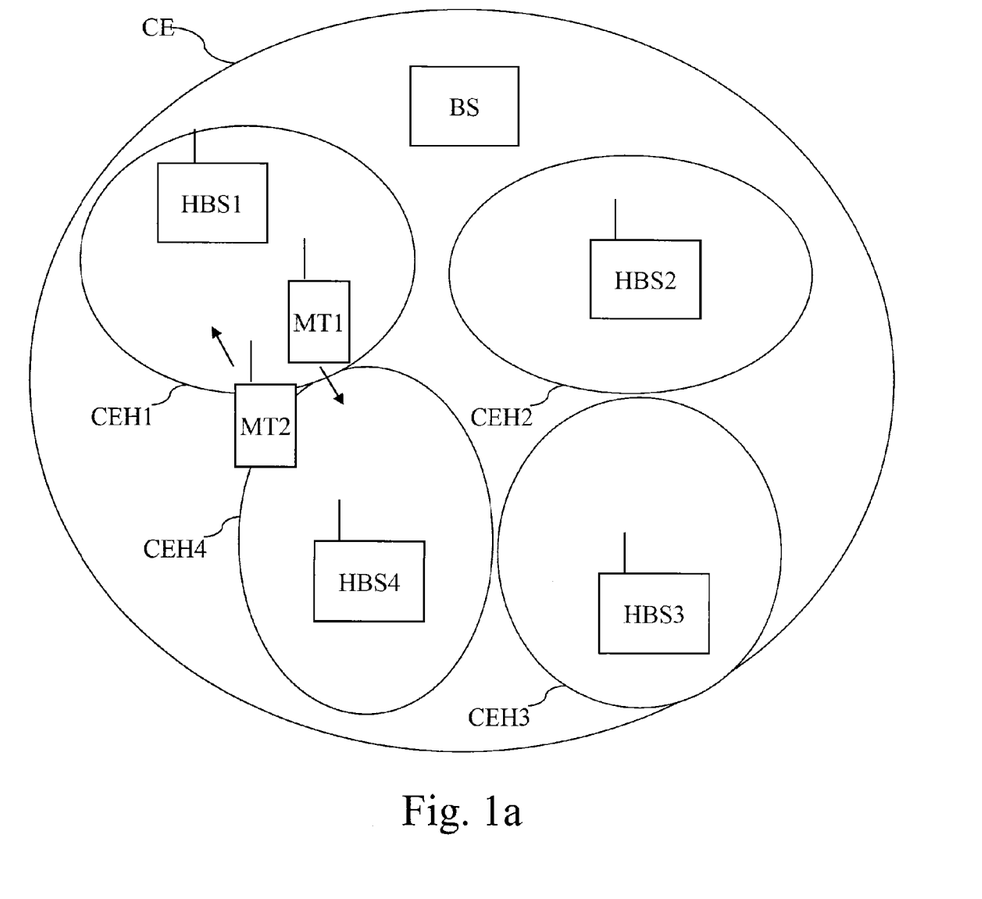
FIG. 1a represents a wireless cellular telecommunication network in which the present invention is implemented according to a first and second modes of realization of the present invention.

In FIG. 1a, one base station BS and plural home base stations HBS1 to HBS4 of a wireless cellular telecommunication network are shown.

Only one base station BS and four home base stations HBS1 to HBS4 are shown but we can understand that the present invention works when a more important number of base stations BS and/or home base stations HBS exist.

The base station BS is for example a base station of a wireless cellular telecommunication network which serves mobile terminals located in the cell CE of the base station BS.

Only two mobile terminals MT1 and MT2 are shown in FIG. 1a for the sake of clarity.

For example the mobile terminal MT1 is located in the cell CEH1 of the home base station HBS1 and is moving to the cell CEH4 of the home base station HBS4.

For example the mobile terminal MT2 is located in the cell CEH4 of the home base station HBS4 and is moving to the cell CEH1 of the home base station HBS1.

The home base stations HBS1 to HBS4 are named also femto base stations or pico base stations or relays. For example, a relay is a home base station HBS which is connected to the wireless cellular telecommunication network via a wireless link with the base station BS.

Each home base station HBS1 to HBS4 is for example located into home and may enable mobile terminals MT associated to the home base stations HBS1 to HBS4 to access the wireless cellular telecommunication network.

For example, the home base stations HBS1 to HBS4 are located in the same building.

For example, a home base station HBS and a mobile terminal MT are associated when the home base station HBS belongs to the owner of the mobile terminal MT or when the home base station HBS belongs to the family or friends of the owner of the mobile terminal MT.

When a mobile terminal MT is served by a base station BS or a home base station HBS, it can receive or establish or continue a communication with a remote telecommunication device through the base station BS or the home base station HBS.

When a mobile terminal MT is associated to a home base station HBS, it belongs to the CSG of the home base station HBS or the home base station HBS belongs to the CSG list of the mobile terminal MT.

The base station BS is able to receive signals transferred by mobile terminals MT which are located in the area CE. The base station BS transfers signals which can be received and processed by mobile terminals MT located in the cell CE.

In the example of FIG. 1a, the base station BS has only one cell CE. The present invention is also applicable when the base station BS has plural cells. In that case, the present invention is applied independently for each cell of the base station BS.

Figure 1B:
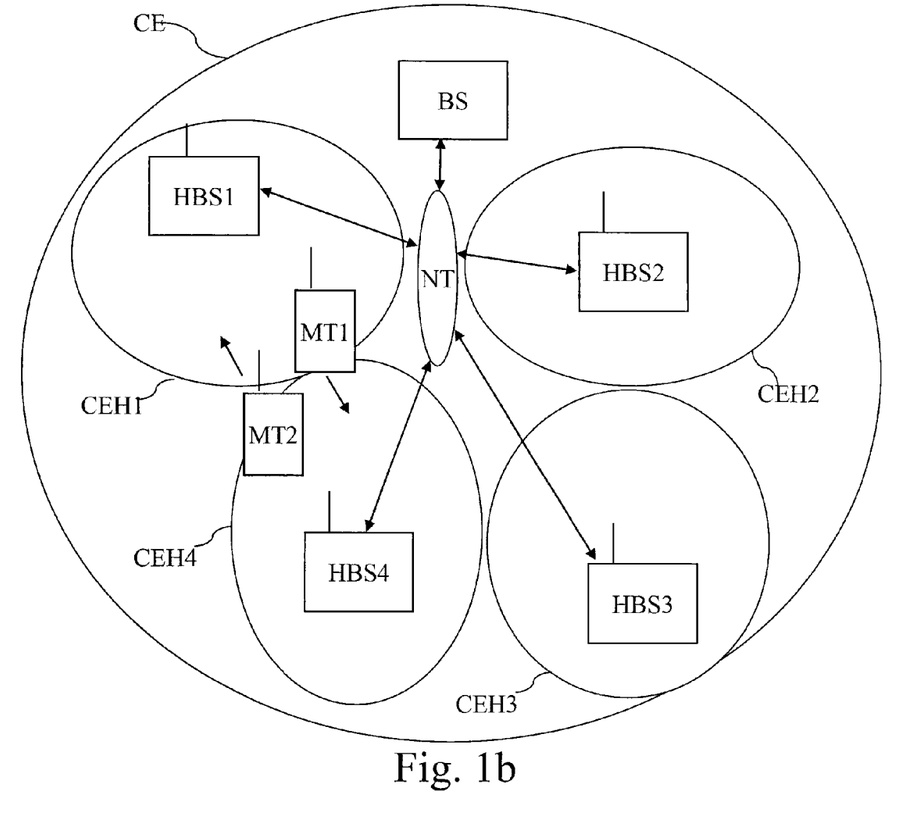
FIG. 1b represents a wireless cellular telecommunication network in which the present invention is implemented according to a third mode of realization of the present invention.

In the example of FIG. 1b, each home base station HBS has only one cell CEH. The present invention is also applicable when one or more home base stations HBS has or have plural cells. In that case, the present invention is applied independently for each cell of each home base station HBS.

The home base station HBS1 is able to receive signals transferred by mobile terminals MT which are located in the cell CEH1. The home base station HBS1 transfers signals which can be received and processed by mobile terminals MT located in the cell CEH1.

The home base station HBS2 is able to receive signals transferred by mobile terminals MT which are located in the cell CEH2. The home base station HBS2 transfers signals which can be received and processed by mobile terminals MT located in the cell CEH2.

The home base station HBS3 is able to receive signals transferred by mobile terminals MT which are located in the cell CEH3. The home base station HBS3 transfers signals which can be received and processed by mobile terminals MT located in the cell CEH3.

The home base station HBS4 is able to receive signals transferred by mobile terminals MT which are located in the cell CEH4. The home base station HBS4 transfers signals which can be received and processed by mobile terminals MT located in the cell CEH4.

The home base stations HBS are comprised in the cell CE of the base station BS.

As the home base stations HBS are located in the cell CE, the level of interference in the cells CEH of the home base stations HBS is high, mobile terminals located in cells CEH may not be able to receive signals transferred by the base station BS.

The mobile terminal MT1 is located in the cell CEH1 of the home base station HBS1. The mobile terminal MT1 is in idle mode and is not associated to the home base stations HBS1 and HBS4.

The mobile terminal MT2 is located in the cell CEH4 of the home base station HBS4. The mobile terminal MT2 is in idle mode and is not associated to the home base stations HBS1 and HBS4.

A mobile terminal is in idle mode when it is not performing a communication with a remote telecommunication device.

According to the first and second modes of realization of the present invention, the home base stations HBS1 to HBS4 are not connected to each other through a communication network.

When trying to connect to the wireless cellular telecommunication network in order to autonomously initiate connection or after paging, the mobile terminal MT1 or MT2 is rejected by the home base station HBS1 or HBS4 because it is not associated to the home base station HBS1 or HBS4 and is not able to connect the base station BS due to too high interference.

According to the invention, the home base station HBS:

transfers through the wireless interface signals identifying a third tracking area which is different from the first and second tracking areas and which the base station and the home base station do not belong to, checks if a signal is received from the mobile terminal in response to the transferred signals identifying to the third tracking area, enters an inter cell interference coordination procedure if the signal is received from the mobile terminal in response.

FIG. 1b represents a wireless cellular telecommunication network in which the present invention is implemented according to a third mode of realization of the present invention.

In FIG. 1b, one base station BS and plural home base stations HBS1 to HBS4 of a wireless cellular telecommunication network are shown.

Only one base station BS and four home base stations HBS1 to HBS4 are shown but we can understand that the present invention works when a more important number of base stations BS and/or home base stations HBS exist.

The base station BS is for example a base station of a wireless cellular telecommunication network which serves mobile terminals located in the cell CE of the base station BS.

Only two mobile terminals MT1 and MT2 are shown in FIG. 1b for the sake of clarity.

For example the mobile terminal MT1 is located in the cell CEH1 of the home base station HBS1 and is moving to the cell CEH4 of the home base station HBS4.

For example the mobile terminal MT2 is located in the cell CEH4 of the home base station HBS4 and is moving to the cell CEH1 of the home base station HBS1.

The home base stations HBS1 to HBS4 are named also femto base stations or pico base stations or relays. For example, a relay is a home base station HBS which is connected to the wireless cellular telecommunication network via a wireless link with the base station BS.

Each home base station HBS1 to HBS4 is for example located into home and may enable mobile terminals MT associated to the home base station HBS to access the wireless cellular telecommunication network.

For example, the home base stations HBS1 to HBS4 are located in the same building.

For example, a home base station HBS and a mobile terminal MT are associated when the home base station HBS belongs to the owner of the mobile terminal MT or when the home base station HBS belongs to the family or friends of the owner of the mobile terminal MT.

When a mobile terminal MT is served by a base station BS or a home base station HBS, it can receive or establish or continue a communication with a remote telecommunication device through the base station BS or the home base station HBS.

When a mobile terminal MT is associated to a home base station HBS, it belongs to the CSG of the home base station HBS or the home base station HBS belongs to the CSG list of the mobile terminal MT.

The base station BS is able to receive signals transferred by mobile terminals MT1 and MT2 which are located in the area CE. The base station BS transfers signals which can be received and processed by mobile terminals MT located in the cell CE. In the example of FIG. 1b, the base station BS has only one cell CE.

The present invention is also applicable when the base station BS has plural cells. In that case, the present invention is applied independently for each cell of the base station BS.

In the example of FIG. 1b, each home base station HBS has only one cell CEH. The present invention is also applicable when one or more home base stations HBS has or have plural cells. In that case, the present invention is applied independently for each cell of each home base station HBS.

The home base station HBS1 is able to receive signals transferred by mobile terminals MT which are located in the cell CEH1. The home base station HBS1 transfers signals which can be received and processed by mobile terminals MT located in the cell CEH1.

The home base station HBS2 is able to receive signals transferred by mobile terminals MT which are located in the cell CEH2. The home base station HBS2 transfers signals which can be received and processed by mobile terminals MT located in the cell CEH2.

The home base station HBS3 is able to receive signals transferred by mobile terminals MT which are located in the cell CEH3. The home base station HBS3 transfers signals which can be received and processed by mobile terminals MT located in the cell CEH3.

The home base station HBS4 is able to receive signals transferred by mobile terminals MT which are located in the cell CEH4. The home base station HBS4 transfers signals which can be received and processed by mobile terminals MT located in the cell CEH4.

The home base stations HBS are comprised in the cell CE of the base station BS.

As the home base stations HBS are located in the cell CE, the level of interference in the cells CEH of the home base stations HBS is high, mobile terminals located in cells CEH may not be able to receive signals transferred by the base station BS.

The mobile terminal MT1 is located in the cell CEH1 of the home base station HBS1. The mobile terminal MT1 is in idle mode and is not associated to the home base stations HBS1 and HBS4.

The mobile terminal MT2 is located in the cell CEH4 of the home base station HBS4. The mobile terminal MT2 is in idle mode and is not associated to the home base stations HBS1 and HBS4.

According to the third mode of realization of the present invention, the home base stations HBS1 to HBS4 are connected to each other through a communication network NT which may be a part of the wireless cellular telecommunication network or which is different from the wireless cellular telecommunication network.

The communication network NT is for example, an internet network or an ISDN (Integrated Services Digital Network) network or is composed of wireless links linking the home base stations HBS, etc.

When trying to connect to the wireless cellular telecommunication network in order to autonomously initiate connection or after paging, the mobile terminal MT1 or MT2 is rejected by the home base station HBS1 or HBS4 because it is not associated to the home base station HBS1 or HBS4 and is not able to connect the base station BS due to too high interference.

According to the invention, the home base station:

transfers through the wireless interface signals identifying a third tracking area which is different from the first and second tracking areas and which the base station and the home base station do not belong to, checks if a signal is received from the mobile terminal in response to the transferred signals identifying to the third tracking area, notifies other home base stations located in the cell of the base station that the home base station is entering an inter cell interference coordination procedure, enters an inter cell interference coordination procedure if the signal is received from the mobile terminal in response.

Figure 2:
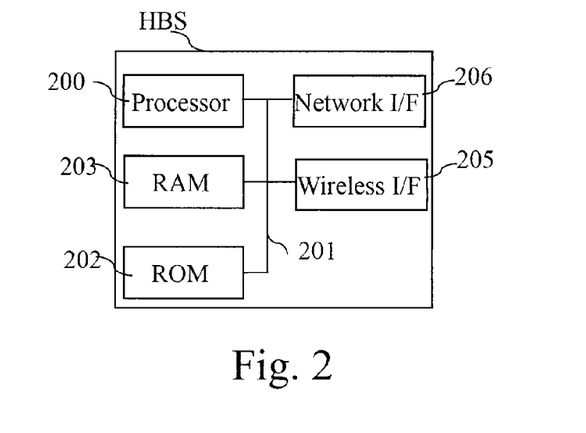
FIG. 2 is a diagram representing the architecture of a home base station in which the present invention is implemented.

FIG. 2 is a diagram representing the architecture of a home base station in which the present invention is implemented.

Figure 3:
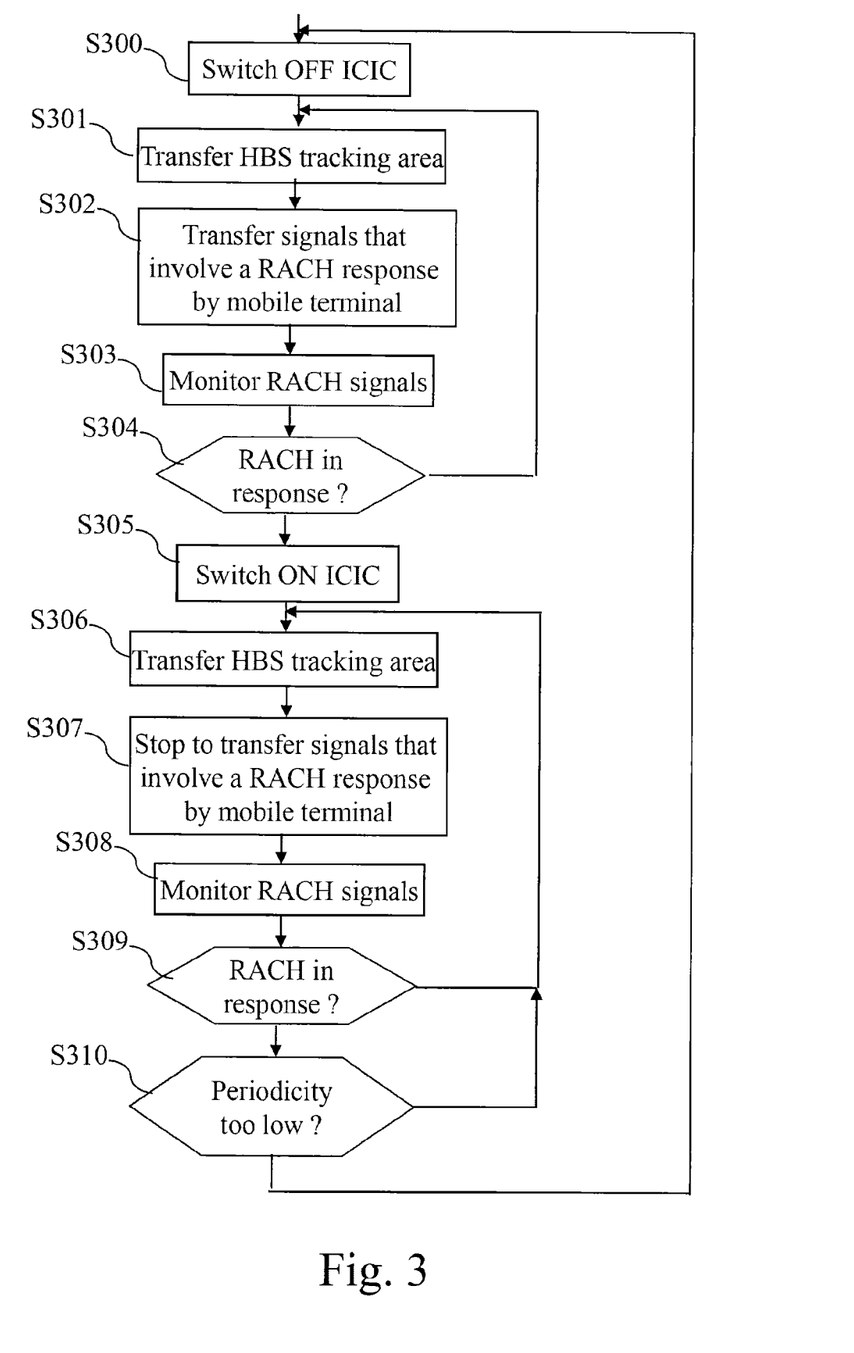
FIG. 3 discloses an algorithm which is executed by a home base station according to a first mode of realization of the present invention.
Figure 4:
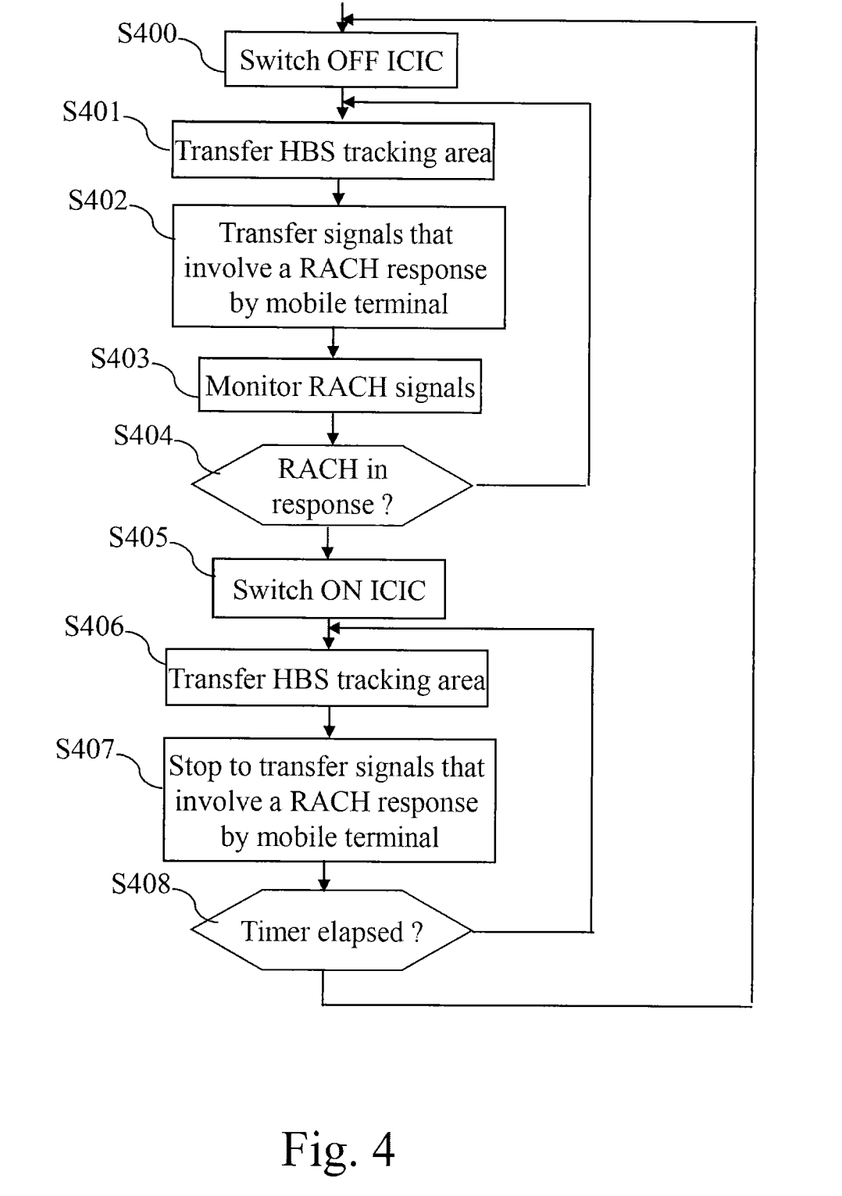
FIG. 4 discloses an algorithm which is executed by a home base station according to a second mode of realization of the present invention.
Figure 5:
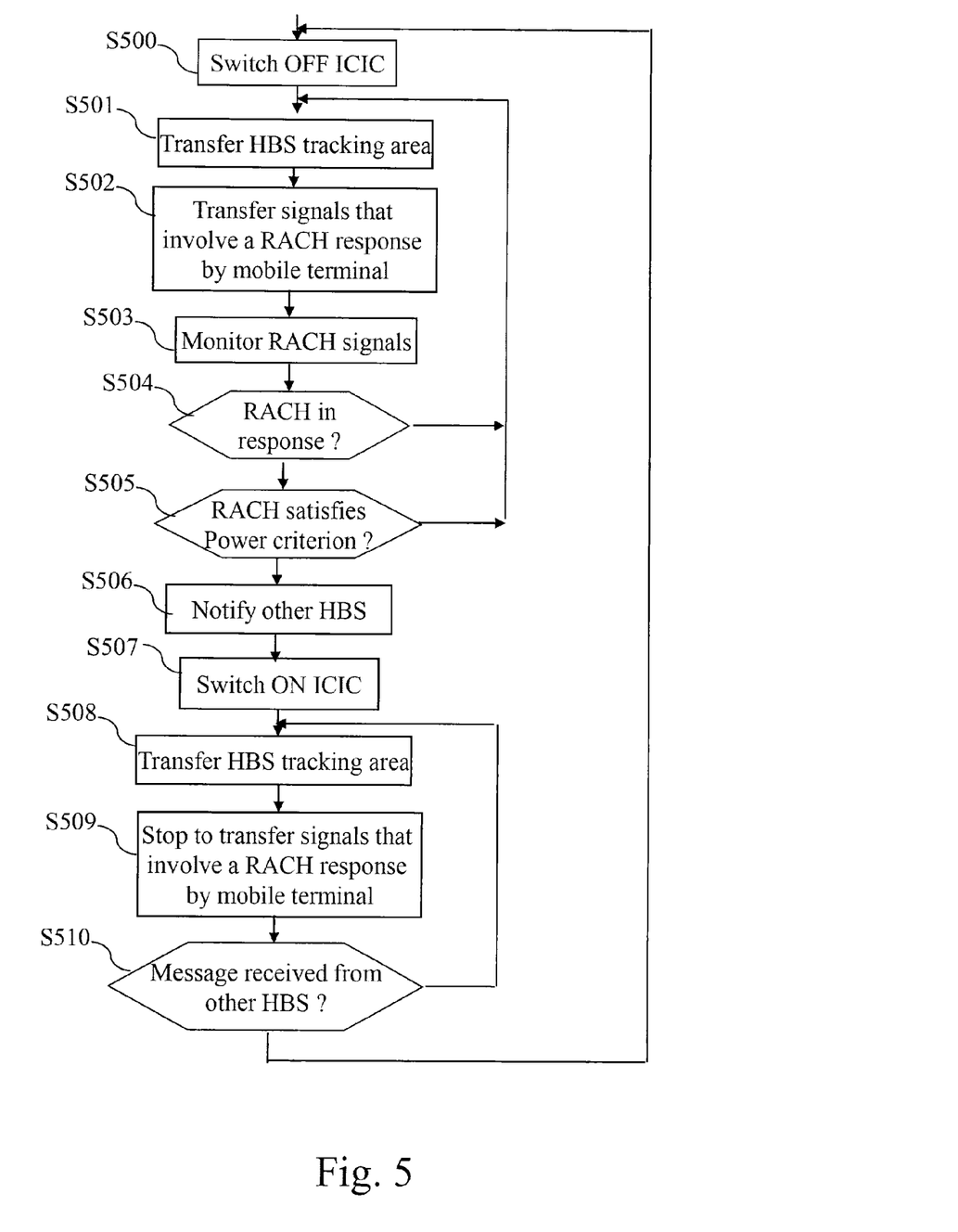
FIG. 5 discloses an algorithm which is executed by a home base station according to a third mode of realization of the present invention.

The home base station HBS has, for example, an architecture based on components connected together by a bus 201 and a processor 200 controlled by the programs as disclosed in FIG. 3 or 4 or 5.

The bus 201 links the processor 200 to a read only memory ROM 202, a random access memory RAM 203, a wireless interface 205 and a network interface 206.

The memory 203 contains registers intended to receive variables and the instructions of the programs related to the algorithms as disclosed in FIG. 3 or 4 or 5.

The processor 200 controls the operation of the network interface 206 and of the wireless interface 205.

The read only memory 202 contains instructions of the program related to the algorithms as disclosed in FIG. 3 or 4 or 5, which are transferred, when the home base station HBS is powered on, to the random access memory 203.

The home base station HBS is connected to a telecommunication network of the wireless cellular telecommunication network through the network interface 206 and according to the third mode of realization to the network NT which may be included or not included in the wireless cellular telecommunication network.

For example, the network interface 206 is a DSL (Digital Subscriber Line) modem, or an ISDN (Integrated Services Digital Network) interface.

Through the network interface 206, the home base station HBS may transfer ongoing communication.

According to the third mode of realization of the present invention, the home base station HBS may transfer or receive messages to or from other home base stations via or not via the base station BS. The link between home base stations HBS is named for example X2 link.

The network NT may be, in a variant, a wireless network. In that case, messages are transferred through the wireless interface 205. The network NT may be partly included in the telecommunication network, the other part of the network NT being wireless.

The wireless interface 205 and the network interface 206 are the resources of the home base station HBS used by a mobile terminal in order to access the wireless cellular telecommunication network when the mobile terminal establishes or receives a communication with a remote telecommunication device.

FIG. 3 discloses an algorithm which is executed by a home base station according to a first mode of realization of the present invention.

The present algorithm is executed by each home base station HBS1 to HBS4.

The present algorithm will be disclosed when it is executed by the home base station HBS1.

At step S300, the processor 200 of the home base station HBS commands the wireless interface 205 in order to interrupt the ICIC procedure.

During the ICIC procedure, instead of transferring regularly downlink frames or sub-frames, some of the frames or sub-frames are not transferred or are muted and/or the transmission power of the signals transferred by the wireless interface 205 is reduced in order to enable the mobile terminal MT to receive signals transferred by the base station BS.

At next step S301, the processor 200 commands the wireless interface 205 to transfer signals identifying the tracking area the home base station HBS1 belongs to.

The tracking area that the home base station HBS1 belongs to may be different from the tracking area of at least one of the home base stations HBS2 to HBS4 or the tracking area the home base station HBS1 belongs to may be the same as the tracking area of each home base station HBS2 to HBS4.

The tracking area that the home base station HBS1 belongs to may be different from the tracking area of the base station BS or the tracking area the home base station HBS1 belongs to may be the same as the tracking area of the base station BS.

At next step S302, the processor 200 commands the wireless interface 205 to transfer signals identifying another tracking area the base station BS and the home base station HBS1 do not belong to.

Transferred signals are signals which are necessary to identify a tracking area but also for a mobile terminal to send a random access signal (RACH signal). Transferred signals are for example synchronization signals, reference signals, system information, control channel if control signaling is required to detect system information.

When a mobile terminal MT receives signals identifying a tracking area which is different from the one the mobile terminal MT is supposed to be located in, the mobile terminal MT sends in response a RACH signal.

Signals transferred at step S302 comprise information indicating on which resource, the mobile terminal MT has to transfer the RACH signal in response to the signals transferred at step S302. Resources may be time resources and/or frequency resources and/or code resources to be used by the mobile terminal MT.

It has to be noted here that the indicated resources are different from the one the home base station HBS1 may indicate for responding to the transfer of signals identifying the tracking area the home base station HBS1 belongs to and are different from the one the base station BS may indicate for responding to the transfer of signals identifying the tracking area of the base station BS.

In order to avoid jeopardizing synchronization, the signals transferred at step S302 may be time shifted from the one transferred at step S301.

At next step S303, the processor 200 commands the wireless interface 205 in order to monitor signals on the indicated resources.

At next step S304, the processor 200 checks if a RACH signal is received by the wireless interface 205 on the indicated resources.

If a RACH signal is received by the wireless interface on the indicated resources, the processor 200 moves to step S305. Otherwise the processor 200 returns to step S301.

At step S305, the processor 200 commands the wireless interface 205 in order to start the ICIC procedure.

During the ICIC procedure, instead of transferring regularly downlink frames or sub-frames, some of the frames or sub-frames are not transferred or are muted and/or the transmission power of the signals transferred by the wireless interface 205 is reduced in order to enable the mobile terminal MT to receive signals transferred by the base station BS.

At next step S306, the processor 200 commands the wireless interface 205 to transfer signals identifying the tracking area the home base station HBS1 belongs to.

At next step S307, the processor 200 commands the wireless interface 205 to interrupt the transfer of signals identifying the tracking area, the base station BS and the home base station HBS1 do not belong to.

At next step S308, the processor 200 commands the wireless interface 205 in order to monitor signals on the resources indicated at step S302.

At next step S309, the processor 200 checks if a RACH signal is received by the wireless interface 205 on the indicated resources.

If a RACH signal is received by the wireless interface on the indicated resources, the processor 200 moves to step S310. Otherwise the processor 200 returns to step S306.

If a RACH signal is received by the wireless interface on the indicated resources, it means that the mobile terminal MT has received signals transferred by another home base station HBS which identifies a tracking the base station BS and the home base station HBS1 do not belong to.

Such case occurs when the mobile terminal MT is leaving the cell CEH1 of the home base station HBS1 and enters the cell of a neighbour home base station HBS.

For example, the mobile terminal MT1 is leaving the cell CEH1 of the home base station HBS1 and enters the cell CEH4 of the home base station HBS4.

As far as no RACH signal is detected at step S309, the ICIC procedure is activated in order to enable the mobile terminal MT to receive signals transferred by the base station BS.

At step S310, the processor 200 checks if the periodicity of the switching from steps S300 to S304 to S305 to S309 is too low.

For example, if the switching periodicity from steps S300 to S304 to S305 to S309 is lower than one second, the periodicity is considered as being too low.

Such case occurs when a mobile terminal is located at the frontier between the cell of the home base station HBS1 and a cell of a neighbour home base station and when another mobile terminal MT is entering the cell of the neighbour home base station.

For example, the mobile terminal MT1 is located at the frontier of the cells CEH1 and CEH4 and responds to signals transferred by the home base stations HBS1 and HBS4. The inter cell interference coordination procedure is going on in cell CEH1.

When the mobile terminal MT2 appears under the coverage of the home base station HBS4 and also close to the home base station HBS1, it sends a RACH signal received by both home base stations HBS1 and HBS4. The home base station HBS1 releases the inter cell interference coordination procedure and the home base station HBS4 enters the inter cell interference coordination procedure. However, the mobile terminal MT1 does not receive the signals transferred by the base station BS anymore due to ICIC being switched off in the home base station HBS1. Thus, the mobile terminal MT1 sends a RACH signal and the home base station HBS1 enters the inter cell interference coordination procedure and the home base station HBS4 releases the inter cell interference coordination procedure. The mobile terminal MT2 does not receive signals transferred by the base station BS anymore and sends a RACH signal. The home base station HBS1 releases the inter cell interference coordination procedure and the home base station HBS4 enters the inter cell interference coordination procedure and so on.

If the periodicity of the switching from steps S300 to S304 to S305 to S309 is too low, the processor 200 returns to step S306. Otherwise, the processor 200 returns to step S300.

It has to be noted here that, prior to returning to step S300, the processor 200 may command the wireless interface 205 in order to monitor the power of uplink signals transferred by mobile terminals which do not belong to the CSG of the home base station HBS1 or which do not have the home base station HBS1 in their CSG list in order to detect if one mobile terminal MT is currently communicating with the base station BS.

The processor 200 waits to return to step S300 as long as one mobile terminal MT is communicating with the base station BS.

It has to be noted here that the periodicity check executed at step S310 may also be implemented in the third mode of realization of the present invention.

FIG. 4 discloses an algorithm which is executed by a home base station according to a second mode of realization of the present invention.

The present algorithm is executed by each home base station HBS1 to HBS4.

The present algorithm will be disclosed when it is executed by the home base station HBS1.

At step S400, the processor 200 of the home base station HBS1 commands the wireless interface 205 in order to interrupt the ICIC procedure.

During the ICIC procedure, instead of transferring regularly downlink frames or sub-frames, some of the frames or sub-frames are not transferred or are muted and/or the transmission power of the signals transferred by the wireless interface 205 is reduced in order to enable the mobile terminal MT to receive signals transferred by the base station BS.

At next step S401, the processor 200 commands the wireless interface 205 to transfer signals identifying the tracking area the home base station HBS1 belongs to The tracking area that the home base station HBS1 belongs to may be different from the tracking area of at least one of the home base stations HBS2 to HBS4 or the tracking area the home base station HBS1 belongs to may be the same as the tracking area of each home base station HBS2 to HBS4.

The tracking area that the home base station HBS1 belongs to may be different from the tracking area of the base station BS or the tracking area the home base station HBS1 belongs to may be the same as the tracking area of the base station BS.

At next step S402, the processor 200 commands the wireless interface 205 to transfer signals identifying another tracking area the base station BS and the home base station HBS1 do not belong to.

Transferred signals are signals which are necessary to identify a tracking area but also for a mobile terminal to send a random access signal (RACH signal). Transferred signals are for example synchronization signals, reference signals, system information, control channel if control signaling is required to detect system information.

When a mobile terminal MT receives signals identifying a tracking area which is different from the one the mobile terminal MT is supposed to be located in, the mobile terminal MT sends in response a RACH signal.

Signals transferred at step S402 comprise information indicating on which resource, the mobile terminal MT has to transfer the RACH signal in response to the signals transferred at step S402. Resources may be time resources and/or frequency resources and/or code resources to be used by the mobile terminal MT.

It has to be noted here that the indicated resources are different from the one the home base station HBS1 may indicate for responding to the transfer of signals identifying the tracking area the home base station HBS1 belongs to and are different from the one the base station BS may indicate for responding to the transfer of signals identifying the tracking area the base station BS belongs to.

In order to avoid jeopardizing synchronization, the signals transferred at step S402 may be time shifted from the one transferred at step S401.

At next step S403, the processor 200 commands the wireless interface 205 in order to monitor signals on the indicated resources.

At next step S404, the processor 200 checks if a RACH signal is received by the wireless interface 205 on the indicated resources.

If a RACH signal is received by the wireless interface on the indicated resources, the processor 200 moves to step S405. Otherwise the processor 200 returns to step S401.

At step S405, the processor 200 commands the wireless interface 205 in order to start the ICIC procedure and activates a timer T.

During the ICIC procedure, instead of transferring regularly downlink frames or sub-frames, some of the frames or sub-frames are not transferred or are muted and/or the transmission power of the signals transferred by the wireless interface 205 is reduced in order to enable the mobile terminal MT to receive signals transferred by the base station BS.

At next step S406, the processor 200 commands the wireless interface 205 to transfer signals identifying the tracking area the home base station HBS1 belongs to.

At next step S407, the processor 200 commands the wireless interface 205 to interrupt the transfer of signals identifying the tracking area the base station BS and the home base station HBS1 do not belong to.

At step S408, the processor 200 checks if the timer T activated at step S405 is elapsed.

If the timer T activated at step S405 is not elapsed, the processor 200 returns to step S406. Otherwise, the processor 200 returns to step S400.

It has to be noted here that the interruption of the ICIC procedure after a predetermined time duration may be also applied in the first and third modes of realization of the present invention.

It has to be noted here that, prior to returning to step S400, the processor 200 may command the wireless interface 205 in order to monitor the power of uplink signals transferred by mobile terminals which do not belong to the CSG of the home base station HBS1 or which do not have the home base station HBS1 in their CSG list in order to detect if one mobile terminal is currently communicating with the base station BS.

The processor 200 waits to return to step S400 as long as one mobile terminal MT is communicating with the base station BS.

FIG. 5 discloses an algorithm which is executed by a home base station according to a third mode of realization of the present invention.

The present algorithm is executed by each home base station HBS1 to HBS4.

The present algorithm will be disclosed when it is executed by the home base station HBS1.

At step S500, the processor 200 of the home base station HBS1 commands the wireless interface 205 in order to interrupt the ICIC procedure.

During the ICIC procedure, instead of transferring regularly downlink frames or sub-frames, some of the frames or sub-frames are not transferred or are muted and/or the transmission power of the signals transferred by the wireless interface 205 is reduced in order to enable the mobile terminal MT to receive signals transferred by the base station BS.

At next step S501, the processor 200 commands the wireless interface 205 to transfer signals identifying the tracking area of the home base station HBS1.

The tracking area that the home base station HBS1 belongs to may be different from the tracking area of a least one of the home base stations HBS2 to HBS4 or the tracking area the home base station HBS1 belongs to may be the same as the tracking area of each home base station HBS2 to HBS4.

The tracking area that the home base station HBS1 belongs to may be different from the tracking area of the base station BS or the tracking area the home base station HBS1 belongs to may be the same as the tracking area of the base station BS.

At next step S502, the processor 200 commands the wireless interface 205 to transfer signals identifying another tracking area the base station BS and the home base station HBS1 do not belong to.

Transferred signals are signals which are necessary to identify a tracking area but also for a mobile terminal to send a random access signal (RACH signal). Transferred signals are for example synchronization signals, reference signals, system information, control channel if control signaling is required to detect system information.

When a mobile terminal MT receives signals identifying a tracking area which is different from the one the mobile terminal MT is supposed to be located in, the mobile terminal MT sends in response a RACH signal.

Signals transferred at step S502 comprise information indicating on which resource, the mobile terminal MT has to transfer the RACH signal. Resources may be time resources and/or frequency resources and/or code resources to be used by the mobile terminal MT.

It has to be noted here that the indicated resources are different from the ones the home base station HBS1 may indicate for responding to the transfer of signals identifying the tracking area the home base station HBS1 belongs to and are different from the one the base station BS may indicate for responding to the transfer of signals identifying the tracking area the base station BS belongs to.

In order to avoid jeopardizing synchronization, the signals transferred at step S502 may be time shifted from the ones transferred at step S501.

At next step S503, the processor 200 commands the wireless interface 205 in order to monitor signals on the indicated resources.

At next step S504, the processor 200 checks if a RACH signal is received by the wireless interface 205 on the indicated resources.

If a RACH signal is received by the wireless interface on the indicated resources, the processor 200 moves to step S505. Otherwise the processor 200 returns to step S501.

At step S505, the processor 200 checks if the power of the received RACH signal is upper than a predetermined value.

If the power of the received RACH signal is upper than a predetermined value, it means that the mobile terminal MT is close to the home base station HBS1, i.e. that the level on interference generated by the home base station HBS1 on the mobile terminal MT is high and that the mobile terminal MT cannot receive signals provided by the base station BS. It is especially true if no open-loop power control is applied by the mobile terminal on RACH signal. The processor 200 moves then to step S506.

If the power of the received RACH signal is not upper than a predetermined value, the processor 200 returns to step S501.

It has to be noted here that in a variant of realization, preferable when open-loop power control is applied by the mobile terminal on the RACH signal, instead of checking if the power of the received RACH signal is upper than a predetermined value, the processor 200 receives through the network NT the power values of RACH signals received by neighbouring home base stations and checks how high the power of the received RACH signal received by the home base station HBS1 is compared to the power values of RACH signals received by neighbouring home base stations HBS2 to HBS4. For instance, the processor 200 checks if the power of the received RACH signal is among a predetermined number of highest received RACH signal powers or within in predetermined number of decibels from the highest received RACH signal power.

In a variant, the step S505 is not executed in the third mode of realization of the present invention. In that variant, if the power of the received RACH signal is upper than a predetermined value, the processor 200 moves from step S504 to S506.

It has to be noted here that the check of the RACH receive power disclosed at step S505 may also be executed in the first and second modes of realization of the present invention.

At step S506, the processor 200 commands the transfer, through the network NT to the neighbouring home base stations HBS2 to HBS4 of a message indicating that the home base station HBS1 starts ICIC procedure.

The message may further comprise information indicating the power pattern and/or time and/or frequency patterns used by the home base station HBS1 during ICIC procedure.

The message may further comprise mobile terminal identities of mobile terminals which have triggered the start of the inter-cell interference coordination procedure, i.e. which have transferred RACH signals received at step S503.

At step S507, the processor 200 commands the wireless interface 205 in order to start the ICIC procedure.

During the ICIC procedure, instead of transferring regularly downlink frames or sub-frames, some of the frames or sub-frames are not transferred and/or the transmission power of the signals transferred by the wireless interface 205 is reduced in order to enable the mobile terminal MT to receive signals transferred by the base station BS.

At next step S508, the processor 200 commands the wireless interface 205 to transfer signals identifying the tracking area of the home base station HBS1.

At next step S509, the processor 200 commands the wireless interface 205 to interrupt the transfer of signals identifying the tracking area the base station BS and the home base station HBS1 do not belong to.

At next step S510, the processor checks if a message is received through the network interface 206, from one neighbouring home base station HBS, the message indicating that the neighbouring home base station HBS starts ICIC procedure.

If one neighbouring home base station starts ICIC procedure, it may indicate that the mobile terminal MT left the cell of the home base station HBS1.

If one neighbouring home base station starts ICIC procedure, the processor 200 returns to steps S500. Otherwise, the processor 200 returns to step S508.

If the received message comprises mobile terminal identities of mobile terminals which have triggered the ICIC procedure, the home base station HBS1 can check whether one of the mobile terminal identities corresponds to a mobile terminal which it considers as being currently in its cell CEH1. If one neighbouring home base station starts ICIC procedure and sends a message comprising the mobile terminal identity corresponding to a mobile terminal which the home base station HBS1 considers as being currently in its coverage area, the processor 200 returns to steps S500. Otherwise, the processor 200 returns to step S508.

It has to be noted here that, prior to returning to step S500, the processor 200 may command the wireless interface 205 in order to monitor the power of uplink signals transferred by mobile terminals which do not belong to the CSG of the home base station HBS1 or which do not have the home base station HBS1 in their CSG list in order to detect if one mobile terminal is currently communicating with the base station BS and waits to return to step S500 as long as a mobile terminal MT is communicating with the base station BS.

Naturally, many modifications can be made to the embodiments of the invention described above without departing from the scope of the present invention.

The invention claimed is:

1. A method for adjusting transmission of signals transferred by a home base station through a wireless interface, the home base station being located in a cell of a base station, the home base station belonging to a first tracking area, the base station belonging to a second tracking area in which a mobile terminal is supposed to be, wherein the method comprises the steps executed by the home base station of:
   transferring, through the wireless interface, signals identifying a third tracking area which is different from the first and second tracking areas and to which the base station and the home base station do not belong;
   checking if a signal is received from the mobile terminal in response to the transferred signals identifying the third tracking area;
   entering an inter cell interference coordination procedure if the signal is received from the mobile terminal in response; and
   interrupting the transferring of the signals identifying the third tracking area and then releasing the inter cell interference coordination procedure if a signal is received from a mobile terminal.

2. The method according to claim 1, wherein the first and second tracking areas are different tracking areas.

3. The method according to claim 1, further comprising:
   transferring, by the home base station through the wireless interface, information indicating on which resources the mobile terminal has to transfer the signal.

4. The method according to claim 1, further comprising:
   locating plural home base stations in the cell of the base station; and
   transferring signals identifying the third tracking area by at least two home base stations.

5. A method for adjusting transmission of signals transferred by a home base station through a wireless interface, the home base station being located in a cell of a base station, the home base station belonging to a first tracking area, the base station belonging to a second tracking area in which a mobile terminal is supposed to be, wherein the method comprises the steps executed by the home base station of:
   transferring, through the wireless interface, signals identifying a third tracking area which is different from the first and second tracking areas and to which the base station and the home base station do not belong;
   checking if a signal is received from the mobile terminal in response to the transferred signals identifying the third tracking area; and
   entering an inter cell interference coordination procedure if the signal is received from the mobile terminal in response, and once the transfer of signals identifying the third tracking area is interrupted:
   checking if a signal is received from one mobile terminal in response to signals identifying one tracking area different from the first and second tracking areas; and
   releasing the inter cell interference coordination procedure if the signal is received from one mobile terminal.

6. The method according to claim 1, further comprising:
   measuring the received power of the signal received from the mobile terminal in response to the transferred signals identifying the third tracking area; and
   further deciding the entering the inter cell interference coordination procedure according to the measured received power.

7. The method according to claim 1, further comprising:
   transferring, through a network linking the home base station and other home base stations which are located in the cell of the base station, a message to the other home base stations indicating that the home base station enters the inter cell interference coordination procedure.

8. The method according to claim 7, further comprising:
   receiving from one of the other home base stations a message indicating that the one of the other home base stations enters the inter cell interference coordination procedure; and
   releasing the inter cell interference coordination procedure once the message is received from the other home base station.

9. The method according to claim 5, further comprising:
   monitoring, by the home base station prior to releasing the inter cell interference coordination procedure, the power of uplink signals transferred by mobile terminals which are not authorized to communicate with the home base station in order to detect if one mobile terminal is communicating with the base station.

10. The method according to claim 1, further comprising:
    releasing the inter cell interference coordination procedure a predetermined time duration after the home base station enters the interference coordination procedure.

11. The method according to claim 5, wherein once the inter cell interference coordination procedure is released, the home base station executes steps comprising:
    transferring, through the wireless interface, additional signals identifying the third tracking area which is different from the first and second tracking areas and to which the base station and the home base station do not belong;
    checking if another signal is received from the mobile terminal in response to the transferred additional signals identifying the third tracking area; and
    entering the inter cell interference coordination procedure if the another signal is received from the mobile terminal in response to the transferred additional signals identifying the third tracking area.

12. A communication device for adjusting transmission of signals transferred by a home base station through a wireless interface,
    the home base station being located in a cell of a base station, the home base station belonging to a first tracking area, the base station belonging to a second tracking area in which a mobile terminal is supposed to be, wherein the communication device is included in the home base station and comprises:

a transmitter that transmits, through the wireless interface, signals identifying a third tracking area which is different from the first and second tracking areas and to which the base station and the home base station do not belong;

a receiver that checks if a signal is received from the mobile terminal in response to the transmitted signals identifying the third tracking area; and a processor configured to enter an inter cell interference coordination procedure if the signal is received from the mobile terminal in response to the transmitted signals identifying the third tracking area and interrupt the transmitted signals identifying the third tracking area and then releasing the inter cell interference coordination procedure if a signal is received from a mobile terminal.

* * * * *